April 13, 1926.
C. T. SMITH
PIPE COUPLING
Filed March 12, 1925
1,580,694
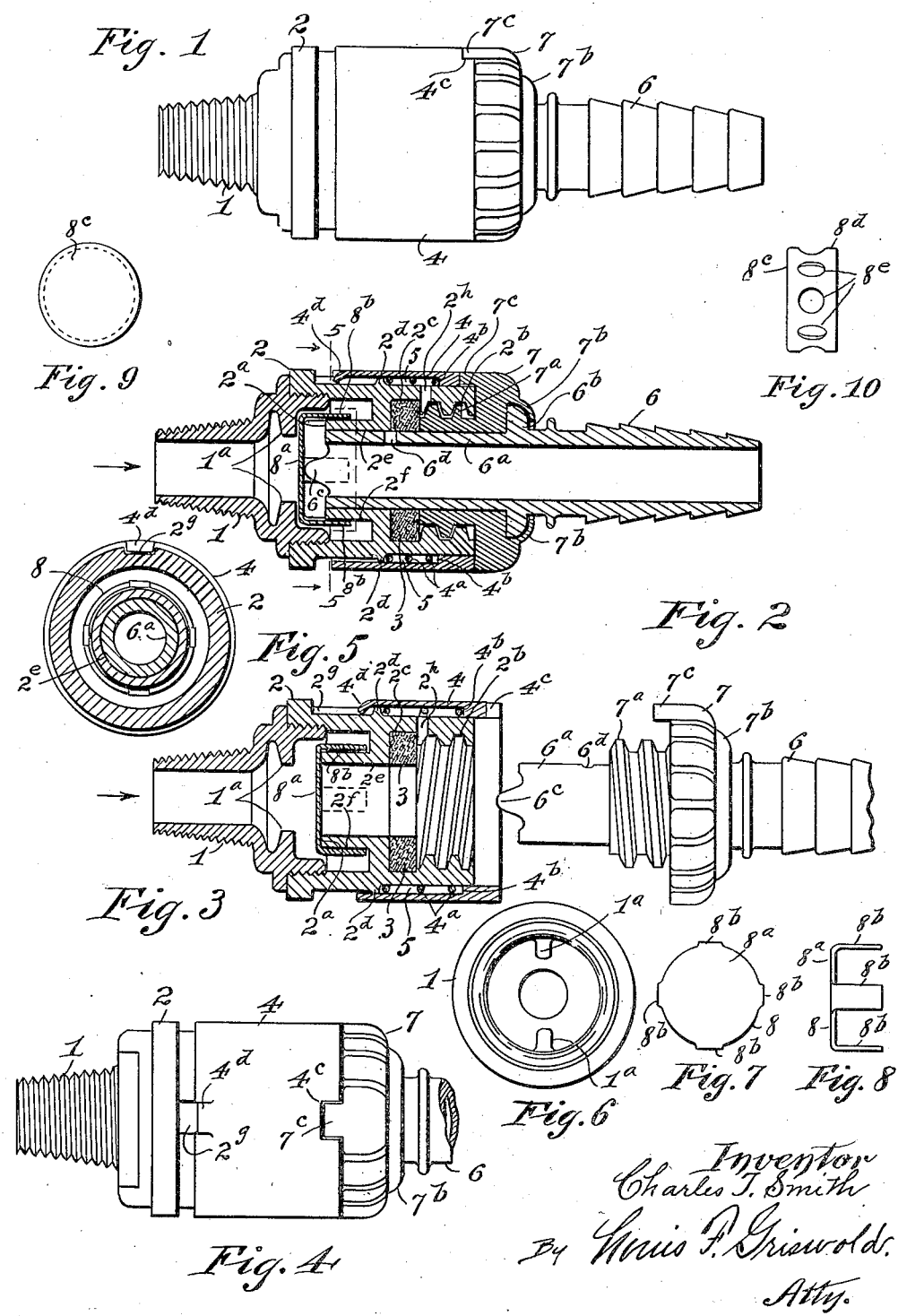
Inventor
Charles T. Smith
By Ennis P. Griswold
Atty.

Patented Apr. 13, 1926.

1,580,694

UNITED STATES PATENT OFFICE.

CHARLES T. SMITH, OF CLEVELAND HEIGHTS, OHIO, ASSIGNOR OF ONE-HALF TO HARVEY K. RUSSELL, OF CLEVELAND, OHIO.

PIPE COUPLING.

Application filed March 12, 1925. Serial No. 15,091.

*To all whom it may concern:*

Be it known that I, CHARLES T. SMITH, citizen of the United States, residing at Cleveland Heights, in the county of Cuyahoga and State of Ohio, have invented certain new and useful Improvements in Pipe Couplings, of which the following is a specification.

This invention relates to couplings for connecting a pipe or hose with a fluid supply source, and it is particularly adapted for use in connection with pneumatic tools.

The primary object of the invention is to provide a coupling that will prevent the escapement of fluid when the tool carrying member is disconnected from the supply member.

With this as a principal object in view, the invention consists in the novel construction of a coupling providing a valve adapted to be seated by fluid pressure to prevent the escape of the fluid when the coupling is disconnected, and adapted to be automatically raised from its seat upon connecting the tool carrying terminal member and the supply member.

The invention further consists in the peculiar arrangement and combination of the various parts of the coupling, and in certain details of construction as will be hereinafter fully described and especially pointed out in the appended claims, reference being had to the accompanying drawing which is made part of the specification and in which similar reference characters are employed to designate corresponding parts.

In the said drawing,—Figure 1 is an elevation of the improved coupling. Fig. 2 is a central vertical section through the coupling. Fig. 3 illustrates the tool connection and the supply connection uncoupled, with the supply connection in central vertical section. Fig. 4 is an elevation taken at right angles to that shown in Fig. 1. Fig. 5 is a cross-section on line 5—5 of Fig. 2. Fig. 6 is an interior end view of the stem element of the fluid supply element. Fig. 7 is a face view of the valve member. Fig. 8 is a side view of said valve. Fig. 9 is a face view of a modified valve, and Fig. 10 is a side view of the modified valve.

The present embodiment of the invention comprises a stem element 1 adapted for connection with a pipe, not shown, which leads to the supply source. The stem 1 is threaded into a valve casing 2. The casing 2 is provided with a reduced part which forms a valve seat $2^a$, and is internally threaded, preferably with a quick thread, as shown at $2^b$. At the terminal of the thread $2^b$ is an annular groove $2^c$ which provides a seat for packing 3. A sleeve 4 is mounted on the member 2 and is adapted to slide longitudinally thereon, the sliding action being brought about, in one direction by the tool carrying member, as presently explained, and the reverse action being governed by a spiral spring $4^a$ confined in an annular space 5. The terminals of the spring $4^a$ bear, respectively, on an abutment, or abutments $2^d$, provided on the element 2, and on a shoulder $4^b$ provided on the sleeve 4.

The tool carrying member comprises a stem 6 adapted to be connected with a hose, not shown, which is connected with the tool. An extension $6^a$ of the stem 6 is adapted to fit the bore $2^e$ of the valve casing 2, and a flange $6^b$ forms a retainer for a sleeve 7 which is provided with a thread $7^a$ adapted to operate in the thread $2^b$. The sleeve 7 is held on the stem 6 by an annular lip $7^b$ which bears on the flange $6^b$ and allows said sleeve 7 to be rotated on the stem 6. A tongue $7^c$ formed on the sleeve 7 is adapted to engage a recess $4^c$ provided on the sleeve 4.

The valve 8, preferably made of sheet-metal, is formed with a disc $8^a$ provided with a plurality of legs $8^b$ extending therefrom and adapted to slide longitudinally on the wall $2^f$ of an annular recess formed in the casing. A modified form of valve is shown in Figs. 9 and 10. This construction provides a disc $8^c$ having a skirt $8^d$ through which is a plurality of apertures $8^e$. Lugs $6^c$ are formed on the interior end of the element 6, said lugs being adapted to bear on the disk $8^a$ of the valve, and unseat said valve when the sleeve 7 is threaded into the casing 2, thus allowing the fluid from the supply source to pass freely through the coupling. Lugs $1^a$ on the stem element 1 provide stops for the valve 8.

When the tool carrying member is freed from the supply member, and anterior to the complete uncoupling of the members, the lugs $6^c$ are carried away from the valve 8 and the fluid pressure, in the direction of arrows, Figs. 2 and 3, causes said valve to seat at $2^a$ and thereby prevent the escapement of the fluid from the supply source.

The dislodgement of the sleeve 4 from the casing 2 is prevented by a lip 4ᵈ turned inward from said sleeve and engaging a longitudinal groove 2ᵍ in the casing. The limit of longitudinal travel of the sleeve 4 is controlled by the lip 4ᵈ contacting the abutments 2ᵈ. This construction also provides for locking the coupling in a closed condition, in as much as it co-acts with the engagement of the sleeve 7 with the sleeve 4. When the sleeve 7 is being threaded into the casing 2 the tongue 7ᶜ is disengaged from the recess 4ᶜ. This is brought about by sliding the sleeve 4 longitudinally away from the sleeve 7. And when the sleeve 7 has reached its threaded limitation in the casing 2 the recess 4ᶜ is brought into engagement with the tongue 7ᶜ automatically through the action of the spring 4ᵃ, and the rotation of the elements, relative to each other, is prevented by the engagement of the lip 4ᵈ with the groove 2ᵍ, co-acting with the engagement of tongue 7ᶜ with recess 4ᶜ. In the process of uncoupling, the initial operation is the disengagement of the tongue 7ᶜ from the recess 4ᶜ, which is brought by manually shifting the sleeve 4 and compressing the spring 4ᵃ.

In uncoupling the members the valve becomes seated and the fluid from the supply is arrested before the members are completely disengaged. To relieve the residual pressure, a port 6ᵈ is provided in the element 6. This port is so positioned that it will pass the packing 3 and communicate with a port 2ʰ provided in the valve casing 2, and relieve the residual pressure anterior to the complete disengagement of the members. The excess fluid in the tubular element 6 is exhausted through the ports 6ᵈ and 2ʰ into the annular space between the valve casing 2 and the sleeve 4, and the clearance surounding the abutment element, or elements, 2ᵈ provides for the escapement to the outer atmosphere. The exhaust of the excess fluid serves as a scavenger for the spring 4ᵃ and the spring chamber.

What I claim and desire to secure by Letters Patent is:

1. In a coupling of the class described, the combination of a valve casing provided with tubular means for connection to a fluid supply source, said casing being internally threaded and having a reduced part forming a valve seat, a floating valve in said casing adapted to be seated by fluid pressure from the supply source, a packing element at the inner terminal of the thread in said casing, a second member of tubular form provided with means for connection to a fluid operated device, an externally threaded sleeve carried by the second connecting member and adapted to be threaded into the valve casing and contact the packing, and means provided by said second connecting member for opening the valve against the fluid pressure when the threaded connection is made between said member and the valve casing.

2. A coupling of the class described, comprising two co-operating coupling members, one of said members providing a valve casing of tubular formation, having a stem adapted for connection with a fluid supply source, said casing being internally threaded for a distance from one end, and having a reduced portion forming a valve seat and an annular chamber in juxtaposition to the opposite end, a floating valve in said chamber said valve being held on the seat and closed by fluid pressure when the co-operating members are uncoupled, the second co-operating member comprising a tubular element providing a stem for connection with a fluid operated device and adapted to enter the bore of the valve casing, an externally threaded sleeve carried by said last named tubular element, adapted to threaded connection with the valve casing, means provided on the interior terminal of the last named tubular element for longitudinally unseating the valve when the two co-operating members are coupled, stop means for limiting the longitudinal movement of the valve, and guide elements on said valve for centering same.

3. A coupling of the class described, comprising two co-operating coupling members, one of said members providing a valve casing having tubular means for connection to a fluid supply source, said casing being threaded from one end thereof and having a reduced part forming a valve seat oppositely disposed relatively to the threaded portion, a valve in said casing adapted to be seated by fluid pressure from the supply source, a packing element at the terminal of the thread in said casing, a second coupling member of tubular form provided with means for connection to a fluid operated device, and adapted to extend into the bore of the reduced portion of the first named coupling member, an externally threaded sleeve carried by the second tubular member and adapted to be threaded into the valve casing and contact the packing, a port in the extended part of the second tubular member, which is closed when the two co-operating members are coupled, and adapted to communicate with a port provided in the valve casing, when the valve is closed and the members are being uncoupled, and means provided on the extended part of the second coupling member for opening the valve when the threaded connection is made between said member and the valve casing.

4. A coupling of the class described, comprising two co-operating coupling members, one of said members being provided with a valve, means for packing the joint when the two members are engaged, threaded means for engaging the two members and opening the valve, said means being operative without rotating either member, and means for relieving residual pressure after the valve is seated.

5. A coupling of the class described, comprising two co-operating coupling members, one of said members being provided with a valve, means for packing the joint of the two members when engaged, threaded means for engagement of the two members and opening the valve, said means being operated without rotating either member, means for relieving residual pressure after the valve is seated, and locking means for preventing relative rotation of the members when the valve is open.

In testimony whereof I affix my signature.

CHARLES T. SMITH.